United States Patent
Erman et al.

(10) Patent No.: US 8,027,264 B2
(45) Date of Patent: Sep. 27, 2011

(54) METHOD AND APPARATUS FOR MEASURING SUBJECTIVE ASSESSMENT OF DIGITAL VIDEO IMPAIRMENT

(75) Inventors: Bilgehan Erman, Marlboro, NJ (US); Vanita K. Katkar, White House Station, NJ (US); Elissa P. Matthews, Watchung, NJ (US)

(73) Assignee: Alcatel Lucent, Paris (FR)

(*) Notice: Subject to any disclaimer, the term of this patent is extended or adjusted under 35 U.S.C. 154(b) by 533 days.

(21) Appl. No.: 11/756,839

(22) Filed: Jun. 1, 2007

(65) Prior Publication Data
US 2008/0298448 A1 Dec. 4, 2008

(51) Int. Cl.
*H04L 12/26* (2006.01)
(52) U.S. Cl. ........................................ 370/250; 370/255

(58) Field of Classification Search .................. 370/250, 370/254, 255, 401
See application file for complete search history.

(56) References Cited

U.S. PATENT DOCUMENTS

| | | | | |
|---|---|---|---|---|
| 5,596,364 A | * | 1/1997 | Wolf et al. | 348/192 |
| 5,825,807 A | * | 10/1998 | Kumar | 375/130 |
| 6,741,569 B1 | * | 5/2004 | Clark | 370/252 |
| 7,218,928 B2 | * | 5/2007 | Park et al. | 455/423 |
| 2004/0088405 A1 | * | 5/2004 | Aggarwal | 709/224 |
| 2004/0210655 A1 | * | 10/2004 | Martinot et al. | 709/224 |
| 2005/0064820 A1 | * | 3/2005 | Park et al. | 455/67.11 |
| 2007/0053303 A1 | * | 3/2007 | Kryuchkov | 370/250 |

* cited by examiner

*Primary Examiner* — Hong Cho
(74) *Attorney, Agent, or Firm* — Wall & Tong, LLP (57) ABSTRACT

A method and system for using key performance indicators of a transport channel to determine key quality indicators associated with information transported there through.

20 Claims, 4 Drawing Sheets

METHOD AND APPARATUS FOR MEASURING SUBJECTIVE ASSESSMENT OF DIGITAL VIDEO IMPAIRMENT

FIELD OF THE INVENTION

The present invention relates to communication systems and, more specifically, the assessment of information impairments such as video information impairments by correlating both objective and subjective viewpoints.

BACKGROUND OF THE INVENTION

The transmission of video streams over internet protocol (IP) networks (referred to as IP-Video) may impair video quality in specific ways. Key considerations for how network errors impair video image (image quality loss) include the type of equipment used to decode the video stream and the subjective perception of the human viewer. The complexity of video decoding and the subjective nature of the image quality assessment make quantitative interpretation of "quality" difficult.

SUMMARY

Various deficiencies of the prior art are addressed by the present invention of a method and system for using key performance indicators of a transport channel to determine key quality indicators associated with information transported there through. In this manner, an impairment level and/or presentation quality level associated with the information is determined.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION OF THE INVENTION

The invention will be primarily described within the context of a content delivery system adapted according to the present invention. However, those skilled in the art and informed by the teachings herein will realize that the invention is also applicable to content or information delivery systems having differing topologies and/or methodologies than those discussed herein. In essence, the subject invention is applicable to any information delivery system in which propagation of information through the system may result in a degradation of subsequently presented or utilized information.

During transmission of the content from a content source to the content destination, presentation artifacts may be induced within the content stream via transmission channel impairments. Of particular interest is the amount and type of transmission channel impairments to which the content stream may be subjected without resulting in a presentation artifacts deemed by a user to be objectionable. Within the context of the present invention, parameters indicative of the quality of the transport channel are measured and/or determined. These channel-related quality parameters are associated with subsequent presentation artifacts. Certain quality parameters have been found by the inventors to be strongly related to the type and degree of presentation artifacts.

Figure 4:
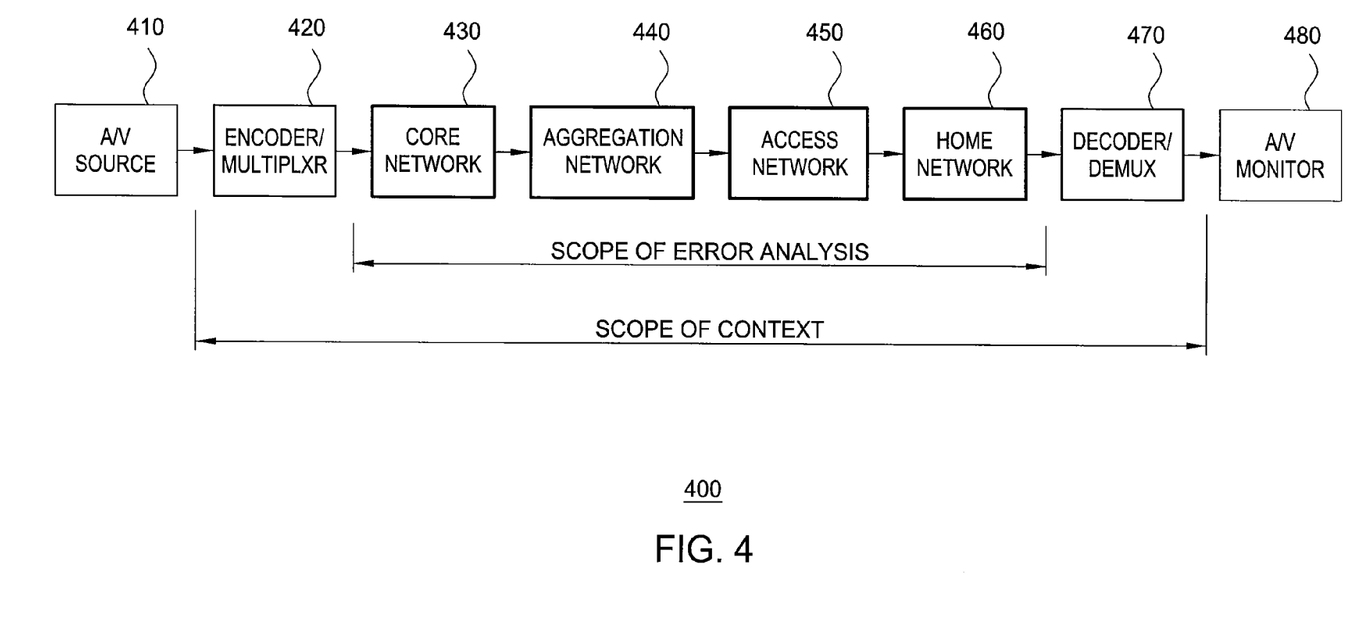
FIG. 4 depicts a block diagram illustrating functional elements associated with the transport of a content stream from a source to destination.

A transport channel is deemed to include at least those portions of a transport network routing, passing or otherwise supporting a content stream of interest. Optionally, the invention is expanded in scope beyond the transport network. That is, the scope of context of the present invention may exceed the scope of error analysis discussed herein. FIG. 4 depicts a block diagram illustrating functional elements associated with the transport of a content stream from a source to destination. Specifically, an audiovisual source 410 provides a baseband audiovisual stream to an encoder/multiplexer 420. The resulting encoded/multiplexed stream is coupled from the encoder/multiplexer 420 to a decoder/demultiplexer 470 via a core network 430, an aggregation network 440, an access network 450 and a home network 460. The decoder/demultiplexer 470 extracts and decodes the original audiovisual stream for presentation by, for example, an audiovisual monitor 480 which receives the content stream as, for example, a baseband signal.

The scope of error analysis discussed herein is directed to error sources within the core 430, aggregation 440, access 450 and home 460 networks. However, the scope of context for the invention further includes the encoder/multiplexer 420 and the decoder/demultiplexer 470 as well as the baseband signals at the endpoints. Thus, while the discussion of impairment of data will be primarily directed to network-induced impairments of a content stream, other impairments of the content stream may also be measured and used to determine the impairment level and/or ultimate presentation quality of that stream.

Impairments may be imparted during the encoding process, the transport process or the decoding process. Such other impairments include encoding artifacts, decoding artifacts, set top box (STB) buffer limitations and/or jitter conditions, source or destination storage limitations and the like. The present invention is adapted to determining the likely impairment to a video, audio or audiovisual stream; stated more generally, the likely impairment to any information stream or data structure.

Within the context of a content stream delivered via an IP network or other packet switched network, artifacts may be induced by packet jitter, packet loss, and the like. An important consideration is the amount of visual and/or aural artifacts that a customer or user will tolerate prior to finding the content stream objectionable. For purposes of this discussion it will be assumed that the content has been encoded to an appropriate or adequate quality level. That is, if the encoded content is decoded and presented without any transmission channel impairments being induced, the subsequent presentation of content will not be objectionable to a user.

Software executing methods according to the present invention may be resident within a network management system (NMS), an element management system (EMS), a remote processing system or other suitable computing device able to receive and process the quality parameters of the transport channel carrying the content stream of interest.

Broadly speaking, within the context of the present invention an assessment of transport channel anomalies is made for the transport channel carrying the content stream of interest. The assessed transport channel anomalies are associated with particular impairments of the content stream, such impairments resulting in noticeable artifacts or other degradation at data information presentation/use.

One embodiment of the invention is a method and apparatus for determining the impairments likely to be induced in a video stream or other stream such that modifications can be made to the content bearing information channel(s) to ensure that a sufficient quality of service level is maintained. In another embodiment of the invention, planned modifications for one or more content bearing information channel(s) are first evaluated with respect to their impact on the quality of multiple content streams propagated there through. That is, the determination or modeling of the effect of transport channel related impairments to a content stream provides an opportunity to optimize the quality of the channel based on the needs of the particular information stream, the needs of multiple information streams, the economic model of transport entities and/or service providers and their respective user communities and so on.

The subject invention uses key performance indicators (KPIs) associated with network performance, network configuration and/or content and service profiles to characterize a likely impact on a content stream propagated through a network. For example, quality-related characteristics of the transport channel are determined by monitoring the IP flow of the transport channel, monitoring quality parameters of the paths from a transport channel, identifying constrained bandwidth portions of the transport channel path and, generally speaking, extracting key attributes associated with the transport channel carrying the transport stream of interest.

The impact of the KPIs on a content stream is defined in terms of key quality indicators (KQIs) to characterize artifacts and/or aberrations of subsequently presented content. Thus, the measures of subjective perception are defined by the inventors as key quality indicators (KQI).

Thus, the objective key performance indicators captured from, for example, the network are used to map subjective key quality indicators associated with a content stream transported to an endpoint. The mapping is based upon a pre-established correlation between objective and subjective parameters. The correlation is derived empirically or via human factors based calculations.

A service performance key quality indicator (KQI) is a quality indicator having associated with it a service attribute. A table of such key quality indicators and their corresponding service attributes is provided below as Table 1.

TABLE 1

| Service Attribute | Key Quality Indicator (KQI) |
| --- | --- |
| PICTURE QUALITY<br>Measured via gathering of subjective customer ratings | Image element loss<br>Image jerkiness or progressive freezing<br>Image blockiness<br>Non IP-affected Impairment: Color, luminosity problems ghosting, letterboxing, aspect/zoom ratio formatting, horiz/vert formatting. |
| AUDIO QUALITY<br>Measured via gathering of subjective customer ratings | Noise: static, chirping, clipping, distortion<br>Volume level fluctuating or inconsistent between channels<br>Sound quality naturalness<br>Audio channel (mono/stereo/quad) problems<br>Wrong language |
| SYNCHRONIZATION<br>milliseconds difference between audio frame and corresponding video frame or between video frame and corresponding caption frame. | Audio + Video (lip synch)<br>Video + Program control (e.g. closed captioning) |

A key performance indicator (KPI) is a performance indicator associated with it a particular category. A table of such key performance indicators and their course binding categories is provided below as Table 2.

TABLE 2

| Category | Key Performance Indicators (KPI) |
| --- | --- |
| Network Performance | Packet loss<br>Bursty Jitter<br>Reordering<br>Bit-error rate (BER) |
| Network Configuration | Decoder buffer size<br>Decoder type<br>Transport protocol<br>Access line bandwidth<br>Access technology<br>CBR/VBR |
| Content & Service Profile | Video frame size<br>Coding protocol<br>Motion<br>Video bit-rate |

A video quality impairment observation threshold is a threshold level associated with a network error that will likely cause a degradation in video quality that either noticeable (low threshold level) or unacceptable (high threshold level) to a viewer.

Figure 1:
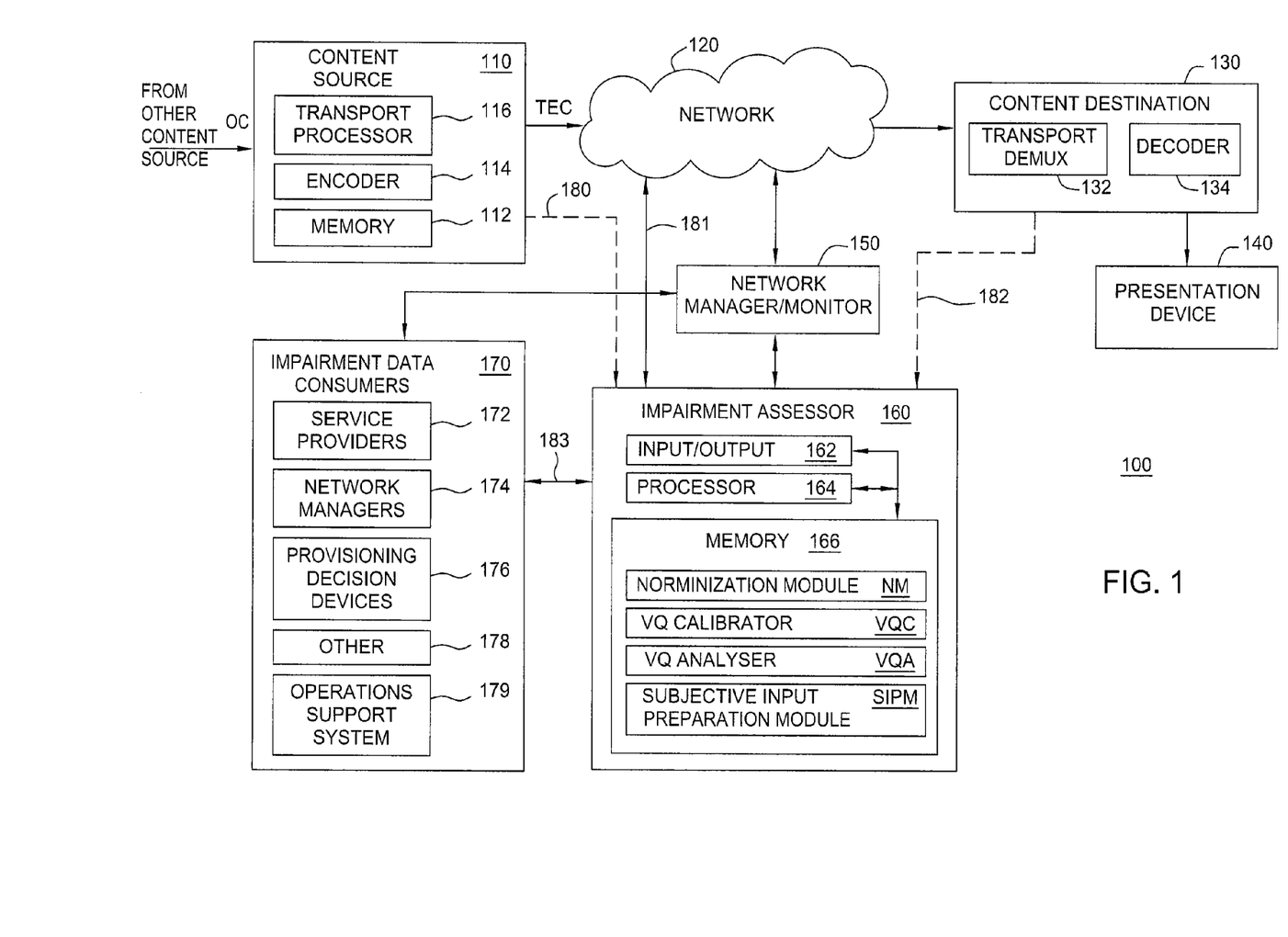
FIG. 1 depicts a high-level block diagram of a content delivery system adapted according to the present invention.

FIG. 1 depicts a high-level block diagram of a content delivery system adapted according to the present invention. Specifically, FIG. 1 depicts a content delivery system 100 in which content, such as audiovisual content, video content and/or related or other data are propagated from a content source 110 to a content destination 130 via a network 120. A presentation device 140, such as a television, computer monitor, audiovisual system and the like, is used to present content delivered to the content destination 130. The network 120 is managed and/or monitored via a network managers/monitor 150. An impairment assessor 160 performs a video quality analysis function to determine a qualitative degradation of a content stream propagated through the network. In this manner, a determination may be made as to whether adaptations in network path, network provisioning, content stream data structure and the like are appropriate to ensure a desired or minimum quality level for delivered and/or presented content. Such a determination may be made by, for example, impairment data consumers 170.

Within the context of the present invention, the term "memory" as used herein with respect to the content source, network, content destination, network manager and/or impairment assessor is intended to be broadly construed as working memory (e.g., random access memory and the like), volatile memory, nonvolatile memory, mass storage device memory and so on. The invention may be represented by software instructions stored in one memory and executed within another memory. Buffering errors, jitter errors and the like associated with different memories used at times to store a content stream may be used within the context of projecting the impairment of content stream quality.

The content source 110 is depicted as including a memory (data storage) 112, an encoder 114 and a transport processor 116. Generally speaking, the memory 112 stores encoded or unencoded content. The encoder 114 depicted in FIG. 1 includes a video encoder conforming to the MPEG-2, MPEG-4 or other video encoding protocols. The encoder 114 is used to encode content retrieved from the memory 112 or received in a content stream OC provided by some other content source (e.g., a live content stream from a television studio, satellite feed and the like). The transport processor 116 is operative to process the encoded content to provide a transport encoded content stream TEC for propagation to the content destination via the network 120.

The network 120 may comprise an Internet protocol (IP) network, an asynchronous transfer mode (ATM) network or any other type of data or telecommunications network. Moreover, while represented as a single network, the network 120 may comprise a plurality of networks including data and/or telecommunications and the like. Since differing networks often have differing levels of quality, a content stream traversing several networks may have a variety of impairments imparted thereto. For example, optical networks and electrical networks and their respective control schemes impair content streams transported there through in different ways depending upon network congestion, priority levels, error correction ability and so on.

The content destination 130 is depicted as including a transport demultiplexer 132 and decoder 134. The transport demultiplexer (i.e., transport processor) 132 extracts from a multiplexed transport stream encoded content stream provided by the content source 110. The decoder 134 decodes this encoded content stream to produce a decoded content stream such as a baseband video and/or audio stream suitable for use by the presentation device 140.

A network manager/monitor 150 may comprise a network management system (NMS), element management system (EMS) or other management system. The network manager/monitor 150 interacts with the network 120 to retrieve therefrom information indicative of network performance. Such information may be derived from network monitoring sources including optical network performance parameters, switch performance parameters, router performance parameters, congestion indicators, as well as indicators of bit error rate, jitter, packet loss, burstiness and the like. Generally speaking, the network manager/monitor 150 performs standard network management functions including the receiving of performance measures associated with the network. The network manager/monitor 150 conveys these performance measures to the impairment assessor 160 for further processing in accordance with the present invention.

In various embodiments of the invention, performance measures of the network 120 are conveyed to the impairment assessor 160 via the network manager/monitor 150, directly from the network 120, from the content source 110 and/or from the content destination 130.

The impairment assessor 160 performs a video quality assessment of the video content stream to be passed through a network 120. While primarily described within the context of a video quality assessment, the impairment assessor 160 optionally performs audio quality assessments, data quality assessments and other quality assessments.

Each of the content storage, content destination, impairment assessor and other functions discussed herein may be implemented by a special purpose computing device or general purpose computer, which simply includes one or more processing elements, input/output elements and memory/storage elements.

Impairment assessor 160 comprises input/output (I/O) circuitry 162, a processor 164 and a memory 166. The I/O circuitry 162 forms an interface between the impairment assessor 160, the network manager/monitor 150, a network 120 and/or a content source 110. The processor 164 executes software instructions retrieved from, for example, the memory/storage 166 to implement thereby various methods and algorithms in accordance with the present invention. The memory 166 is depicted as storing software instructions and related data structures supporting various functional elements, including a normalization module NM, a VQ-calibrator VQC, a VQ-analyzer VQA and a subjective input preparation module SIPM. Other functional elements (not shown) such as operating systems and the like may also be associated with software instructions and data structures stored within the memory 166.

The normalization module NM, VQ-calibrator VQC, VQ-analyzer VQA and subjective input preparation module SIPM will be discussed in more detail below with respect to FIG. 3. Generally speaking, software used to execute or instantiate these functional elements may be provided by a single computing device such as the impairment assessor 160 depicted in FIG. 1, or multiple computing devices (not shown). Each of the functional elements may be associated with its own computing device or multiple computing devices. Moreover, the impairment assessor 160 may be combined with the network manager/monitor 150, provided as multiple distributed functions within a hierarchy of management layers, provided as a local or remote server associated with the network 120 and so on.

In one embodiment of the invention, impairment data consumers utilize the data provided by the impairment assessor 160 to modify various operational parameters of the network 120, the content source 110, the content destination 130 and/or the network manager/monitor 150. Thus, the content delivery system 100 of FIG. 1 depicts impairment data consumers 170 comprising, illustratively, service providers 172, network managers 174, provisioning decision devices 176, operations support system and other consumers 178.

Figure 2:
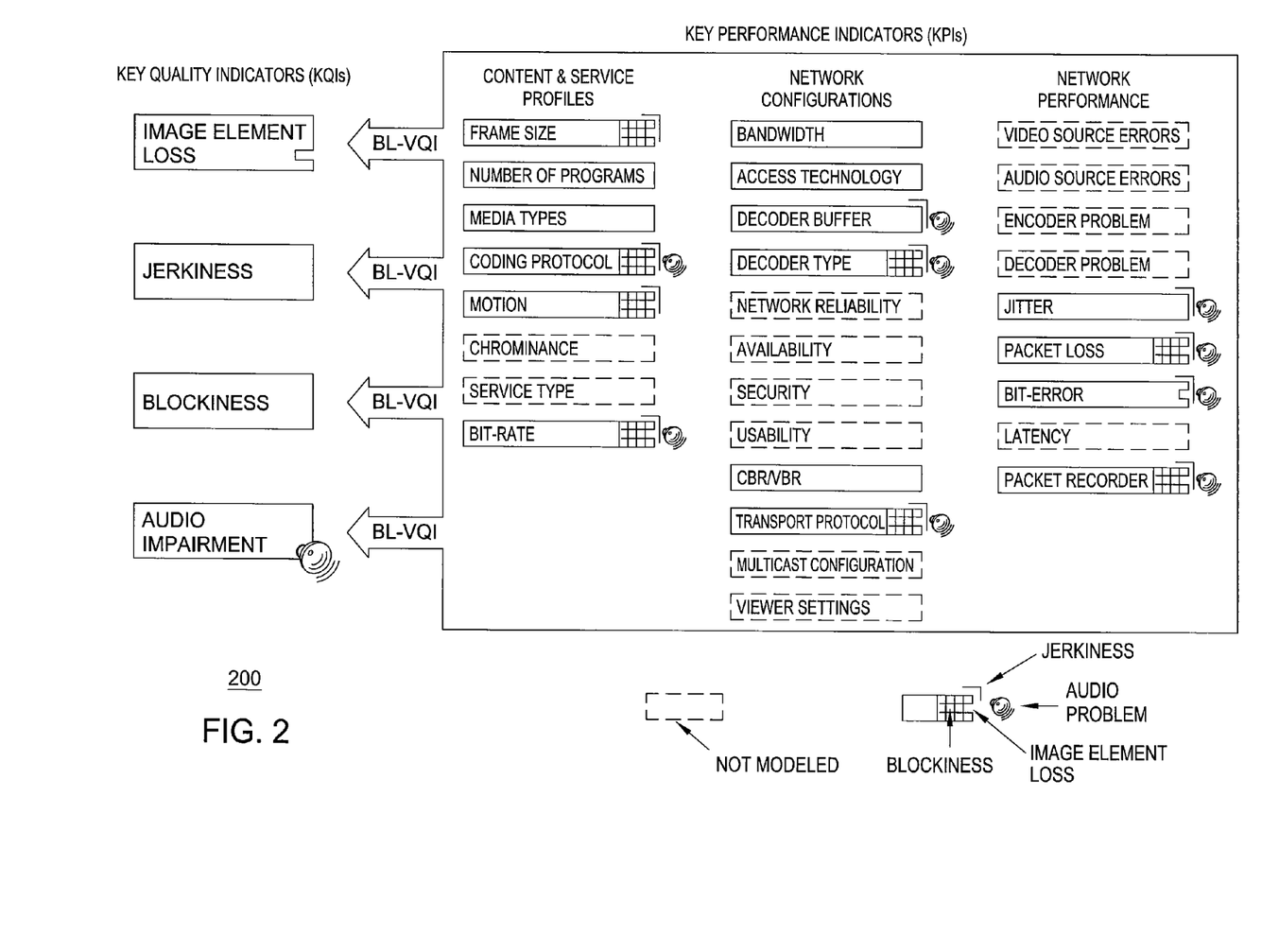
FIG. 2 depicts a high-level block diagram of key performance indicators (KPIs) as related to key quality indicators (KQIs)

The VQA calibration data set is created by the calibration process. The VQA calibration data set which embodies the subjective viewer assessment is created via the calibration process. In one embodiment, the VQA calibration is performed by, for example, synchronizing real-time network measurements 181, network and equipment profiles 182, and content profiles 180 with user "subjective" calibration samples. This is a calibration phase of operation.

In one embodiment, the VQA analysis is performed by associating real-time network measurements 181, network and equipment profiles 182, and content profiles 180 with a pre-generated user "subjective" calibration data, which allows real-time evaluation of viewing quality. This association results in a measurement of the video image quality without the excessive time, CPU and bandwidth consumption that a full reference schema requires. This is an analysis phase of operation.

Thus, in one embodiment the VQA is performed by synchronizing real-time network and content profiles with a predefined user "subjective" calibration domain, which allows real-time evaluation of viewing quality. This synchronization results in a measurement of the video image quality which has most of the accuracy of a reference testing schema without the excessive time, CPU and bandwidth consumption that a full reference schema requires.

FIG. 2 depicts a high-level block diagram of key performance indicators (KPIs) as related to key quality indicators (KQIs). Within the context of the present invention, a KPI may be derived from the categories of content and service profiles, network configuration and/or network performance. FIG. 2 discloses 16 primary key performance indicators distributed among the three categories. Additional key performance indicators are also disclosed in FIG. 2. Further key performance indicators may be identified by those skilled in the art and informed by the teachings of the present invention.

Primary key performance indicators for content and service profiles include, for example, one or more of frame size, number of programs, media types, coding protocol, motion and/or bit rate. Primary key performance indicators for network configuration include, for example, bandwidth, access technology, decoder buffer size, decoder buffer type, use of constant bit rate or variable bit rate streams and/or the transport protocol used. Primary key performance indicators for network performance include, for example, jitter, packet loss, bit error rate (BER) and/or packet reordering.

The subject invention operates to process one or more of the key performance indicators from the content and service profiles 180, network configuration 182 and/or network performance 181 categories to determine key quality indicators. As previously noted, key quality indicators include, for example, image element loss, and jerkiness, blockiness and/or audio impairment.

Figure 3:
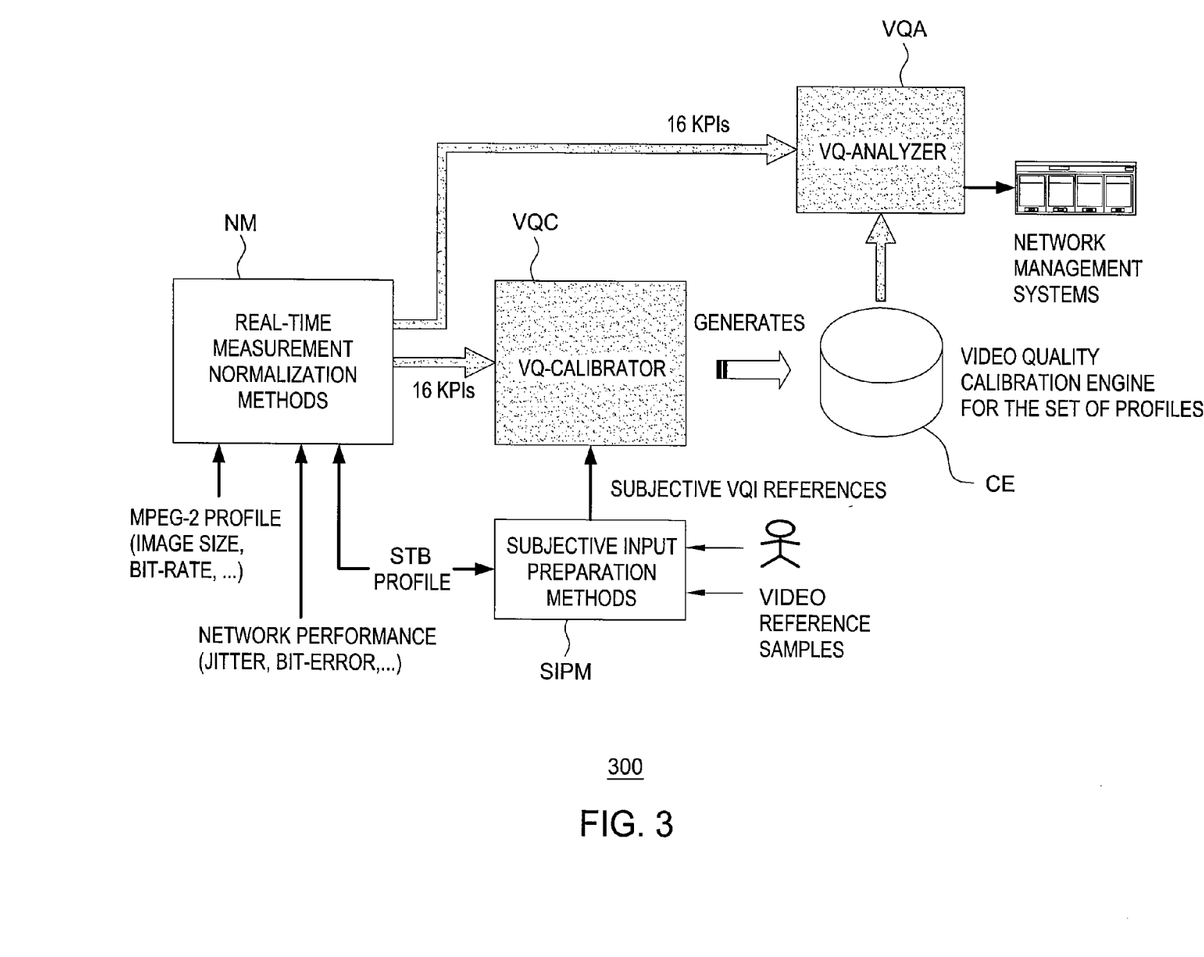
FIG. 3 depicts a high-level block diagram depicting inter-relationships of several functional elements according to an embodiment of the present invention.

FIG. 3 depicts a high-level block diagram depicting interrelationships of several functional elements according to an embodiment of the present invention. In the embodiment of FIG. 3, the depicted functional elements comprise those described above with respect to the impairment assessor 160 of FIG. 1. The apparatus described herein with respect to FIG. 3 may be implemented in hardware, software or a combination of hardware and software, such as described elsewhere in this specification.

The VQ-calibrator VQC performs a core reference coordination function between the network and content profiles and subjective measurements, creating a VQA calibration data set for use by the VQ-analyzer VQA. The VQC enables synchronization of objective measurements of a key performance indicators (KPI) set with the impairment scoring of the human subjects. In one embodiment, the VQC generates a calibration data set using subjective VQI references that are empirically derived. In another embodiment, the VQC generates a calibration data set according to human factor calculations. Such human factor calculations may be based upon, for example, the human factor observations associated with the various MPEG standards and their predecessor standards documents (e.g., Grand Alliance and the like).

The VQ-analyzer VQA uses a vector of real-time data values and the VQA calibration data set to determine a relevant video quality score set. In one embodiment, a continuous transfer function produces this VQA score vector by interpolating between discrete values sampled in real-time and discrete values in the Video Quality calibration data set. The resulting output is displayed and/or passed to monitoring and management applications.

The real-time measurement normalization module NM is based on the development of a set of, illustratively, 16 KPIs that have the most significant impact on IP-video impairments (e.g., the primary KPIs discussed herein). Generally speaking, the impact of any one of the 16 primary KPI elements on IP-Video image can be determined by those skilled in the art. However, the subject invention utilizes various combinations of KPIs in conjunction with the other VQA components to provide a determination of video quality (or other content quality).

The subjective input preparation module SIPM records viewer's subjective scores for a series of video reference samples under varying impaired conditions, and generates a set of response scores for, illustratively, four Video Quality Indicators (VQIs). These VQIs are determined by a) identifying a set of key quality indicators (KQIs) that provide a comprehensive view of digital video quality as it is experienced by television viewers and then b) identifying those KQIs which are most strongly impacted by network problems. These four VQIs comprise image element loss, image jerkiness, image blockiness and overall audio quality. The SIPM may be implemented empirically by having viewers grade image quality with respect to the VQIs and/or by calculation according to human factor principles. In the case of an empirically derived data set, in one embodiment multiple viewers indicate a level of quality (e.g., 0% to 100%) for each of a plurality of time slices (e.g., 10 second intervals) as various performance indicators are changed. In this manner, multiple viewers provide quality assessments of the content streams associated with many KPI combinations.

A Video Quality Analyzer (VQA) according to the invention comprises a method and system for comprehensive determination of, for example, IP Video impairment analysis. Generally speaking, the methodology, apparatus and system of the present invention provide the following capabilities: (1) An accurate representation of video quality using a set of scores; (2) A network error analysis using distinctive characteristics of multiple video quality indicators, assisting network operators to distinguish between transport and encoding impairment vs. impairment from other causes; (3) A determination of the required minimal set of network and video attributes that impact digital video quality, and (4) A cost effective technique to provide high volume subjective scoring of video quality impairments.

Various embodiments of the above-described invention provide a comprehensive set of metrics that can be used for both quality measurement and root cause trouble isolation; a combinational model that includes unique KQI elements, based on both theoretical and lab verified results; and a set of KQI metrics that are adaptable to differing configurations of network core, network access, head end, and customer premise equipment.

Optionally, a separate quality analysis phase is provided in which the output from the analysis process is used in a collaborative manner with video service providers, network managers, management consultants and/or network probe vendors to provide, for example, cost effective solutions to IP Video quality assurance and customer satisfaction problems.

In one embodiment of the invention, a subjective determination of digital video impairments is provided by executing subjective tests and calibrating the results, combining this calibration with real-time network information, set top box (STB) information and content encoding/transport parameters. The output result is a set of values for Video Quality Indicators that provide service quality information about the performance of the IP Video Service as it relates to presentation quality for content transported there through.

The above-described embodiments of the invention may be implemented within the context of methods, computer readable media and computer program processes. Generally speaking, methods according to the invention may be implemented using computing devices having a processor as well as memory for storing various control programs, other programs and data. The memory may also store an operating system supporting the programs. The processor cooperates with conventional support circuitry such as power supplies, clock circuits, cache memory and the like as well as circuits that assist in executing the software routines stored in the memory. As such, it is contemplated that some of the steps discussed herein as software processes may be implemented within hardware, for example as circuitry that cooperates with the processor to perform various steps. Input/output (I/O) circuitry forms an interface between the various functional elements communicating with the device.

A computing device is contemplated as, illustratively, a general purpose computer that is programmed to perform various control functions in accordance with the present invention, the invention can be implemented in hardware as, for example, an application specific integrated circuit (ASIC) or field programmable gate array (FPGA). As such, the process steps described herein are intended to be broadly interpreted as being equivalently performed by software, hardware or a combination thereof.

The invention may also be implemented as a computer program product wherein computer instructions, when processed by a computer, adapt the operation of the computer such that the methods and/or techniques of the present invention are invoked or otherwise provided. Instructions for invoking the inventive methods may be stored in fixed or removable media, transmitted via a data stream in a signal bearing medium such as a broadcast medium, and/or stored within a working memory within a computing device operating according to the instructions.

While the foregoing is directed to various embodiments of the present invention, other and further embodiments of the invention may be devised without departing from the basic scope thereof. As such, the appropriate scope of the invention is to be determined according to the claims, which follow.

What is claimed is:

1. A non-transitory computer readable storage medium storing instructions which, when processed by a computer, adapt the operation of the computer to perform a method for assessing quality of a content stream propagated through a communications system, the method comprising:
    determining a plurality of key-performance indicators (KPIs) associated with the performance of a communications channel adapted to carry the content stream;
    estimating, based on the determined plurality of KPIs, an impairment level of one or more quality indicators (KQIs) associated with the presentation quality of the content stream by executing subjective tests, calibrating the results and combining the calibration with determined KPIs; and
    determining whether the estimated impairment level of the one or more KQIs exceeds a threshold level of impairment.

2. The computer readable medium of claim 1, wherein:
    said communications channel transports said content stream through a plurality of networks.

3. The computer readable medium of claim 2, wherein said plurality of networks includes one or more of a core network, an aggregation network, an access network and a home network.

4. The computer readable medium of claim 1, wherein:
    said content stream includes a video stream; and
    said quality-related characteristics are dependent on the properties of at least one of media type, number of coded programs, coding protocol, available bandwidth, and access network transmission technology.

5. The computer readable medium of claim 4, wherein KPIs associated with the content and service profile category comprise one or more of frame size, coding protocol, motion and coding bit rate.

6. The computer readable medium of claim 1, wherein said quality-related characteristics comprise key performance indicators (KPIs) associated with one or more of a network performance category, a network configuration category and a content and service profile category.

7. The computer readable medium of claim 6, wherein KPIs associated with the network performance category comprise one or more of packet loss, jitter, packet reordering and bit error rate.

8. The computer readable medium of claim 6, wherein KPIs associated with the network configuration category comprise one or more of decoder buffer size, decoder buffer type, and transport protocol used.

9. The computer readable medium of claim 1, wherein:
    said communications channel comprises an internet protocol (IP) network;
    said content stream comprises a video stream;
    said quality-related characteristics comprise key performance indicators (KPIs) associated the performance of the IP network; and
    said step of estimating comprises mapping said determined KPIs to one or more key quality indicators (KQIs).

10. The computer readable medium of claim 9, wherein:
    said KQIs are associated with picture quality attributes, including one or more of image element loss, image jerkiness, image freezing and image blockiness.

11. The computer readable medium of claim 10, wherein:
    said content stream further comprises an audio stream; and
    said KQIs are also associated with audio quality attributes and audiovisual synchronization attributes.

12. The computer readable medium of claim 1, wherein said impairment level estimates are adapted for use by an impairment data consumer.

13. The computer readable medium of claim 12, wherein said impairment data consumer comprises one or more of a service provider, network manager, provisioning decision device and an operations support system.

14. The computer readable medium of claim 12, wherein said impairment data enables said impairment data consumer to adapt communication channel allocations for one or more content streams.

15. A non-transitory computer readable medium for storing computer instructions which, when processed by a computer, adapt the operation of the computer to perform a method for analyzing quality of a content stream propagated through a communications system, the method comprising:
    determining a plurality of key-performance indicators (KPIs) associated with the performance of a communications channel adapted to carry the content stream;
    estimating, based on the determined plurality of KPIs, an impairment level of one or more key quality indicators (KQIs) associated with presentation quality of the content stream by executing subjective tests, calibrating the results and combining the calibration with determined KPIs;
    comparing the estimated impairment level of each of the one or more KQIs to a respective threshold level of impairment to generate impairment data; and
    transmitting the impairment data toward impairment data consumers.

16. The computer readable medium of claim 15, wherein:
said communications channel transports said content stream through a plurality of networks; and
said quality-related characteristics include at least one of a packet loss characteristic, a jitter characteristic, a packet reordering characteristic and a bit-error rate characteristic.

17. Apparatus for analyzing quality of a content stream propagated through a communications system, the apparatus comprising:
a video quality analyzer (VQA) configured to:
generate a video quality score set by analyzing a plurality of measured key performance indicators (KPIs), associated with the performance of a communications channel adapted to carry the content stream, with respect to a calibration data set; and
estimate, using the plurality of KPIs, an impairment level of one or more key quality indicators (KQIs) associated with presentation quality of the content stream by executing subjective tests, calibrating the results and combining the calibration with determined KPIs; and
the calibration data set representing quantitative video assessments associated with each of the plurality of KPIs.

18. The apparatus of claim 17, further comprising:
a video quality calibrator, for generating the calibration data set in response to subjective assessments of imagery for each of a plurality KPIs.

19. The apparatus of claim 17, wherein:
said KPIs are associated with a communications channel within an internet protocol (IP) network; and
said KPIs are associated with a content stream adapted for transport via said communications channel.

20. An apparatus for analyzing quality of a content stream propagated through a communications system, the apparatus comprising:
means for determining a plurality of key-performance indicators (KPIs) associated with the performance of a communications channel adapted to carry the content stream;
means for estimating, based on the determined plurality KPIs, an impairment level of one or more quality indicators (KQIs) associated with presentation quality of the content stream by executing subjective tests, calibrating the results and combining the calibration with determined KPIs; and
means for determining whether the estimated impairment level of the one or more KQIs exceeds a threshold level of impairment.

\* \* \* \* \*